United States Patent [19]
Viala et al.

[11] Patent Number: 5,686,687
[45] Date of Patent: Nov. 11, 1997

[54] MECHANICAL EJECTOR DEVICE INCORPORATING A DOUBLE-ACTING PISTON

[75] Inventors: Jean Viala, Charenton Le Pont; Jean-Claude Bohas, Clamart; Yves Florentin, Montigny Le Bretonneux; Serge Chicot, Aubergenville, all of France

[73] Assignee: Societe Nationale Industrielle et Aerospatiale, France

[21] Appl. No.: 445,665

[22] Filed: May 22, 1995

[30] Foreign Application Priority Data

May 31, 1994 [FR] France ................. 94 06622

[51] Int. Cl.⁶ ........................................ F41F 3/06
[52] U.S. Cl. ................ 89/1.54; 89/1.52; 244/137.4; 74/110
[58] Field of Search ................. 89/1.58, 1.51, 89/1.52, 1.53, 1.54, 1.59; 244/137.4; 74/110

[56] References Cited

U.S. PATENT DOCUMENTS

| | | | |
|---|---|---|---|
| 2,466,980 | 4/1949 | Bronson | 244/137.4 |
| 3,883,097 | 5/1975 | Billot | 244/137.4 |
| 4,194,406 | 3/1980 | Bohlmark | 74/110 |
| 4,637,243 | 1/1987 | Bond | 74/110 |
| 4,685,377 | 8/1987 | Mace et al. | 89/1.54 |
| 5,040,748 | 8/1991 | Torre et al. | 244/137.4 |

FOREIGN PATENT DOCUMENTS

| | | |
|---|---|---|
| 2156425 | 6/1973 | France . |
| 2423397 | 11/1979 | France . |
| 2597553 | 10/1987 | France . |
| 2664373 | 1/1992 | France . |
| 2671175 | 7/1992 | France . |
| 910691 | 11/1962 | United Kingdom .......... 89/1.58 |

*Primary Examiner*—Stephen M. Johnson
*Attorney, Agent, or Firm*—Vanophem Meehan & Vanophem, P.C.

[57] ABSTRACT

A mechanical ejector device includes a sliding piston, a transverse lever articulated to a first fixed axis and to a first mobile axis coupled axially to the piston and including a second mobile axis, a first link articulated to a second fixed axis and including third and fourth mobile axes, a transverse actuator rod articulated to the third mobile axis to displace the latter in a single displacement direction and a second link articulated to the second mobile axis and to the fourth mobile axis. The fixed and mobile axes are parallel. The first link and the second link form a deformable assembly having an intermediate configuration in which the piston is in its service position.

10 Claims, 4 Drawing Sheets

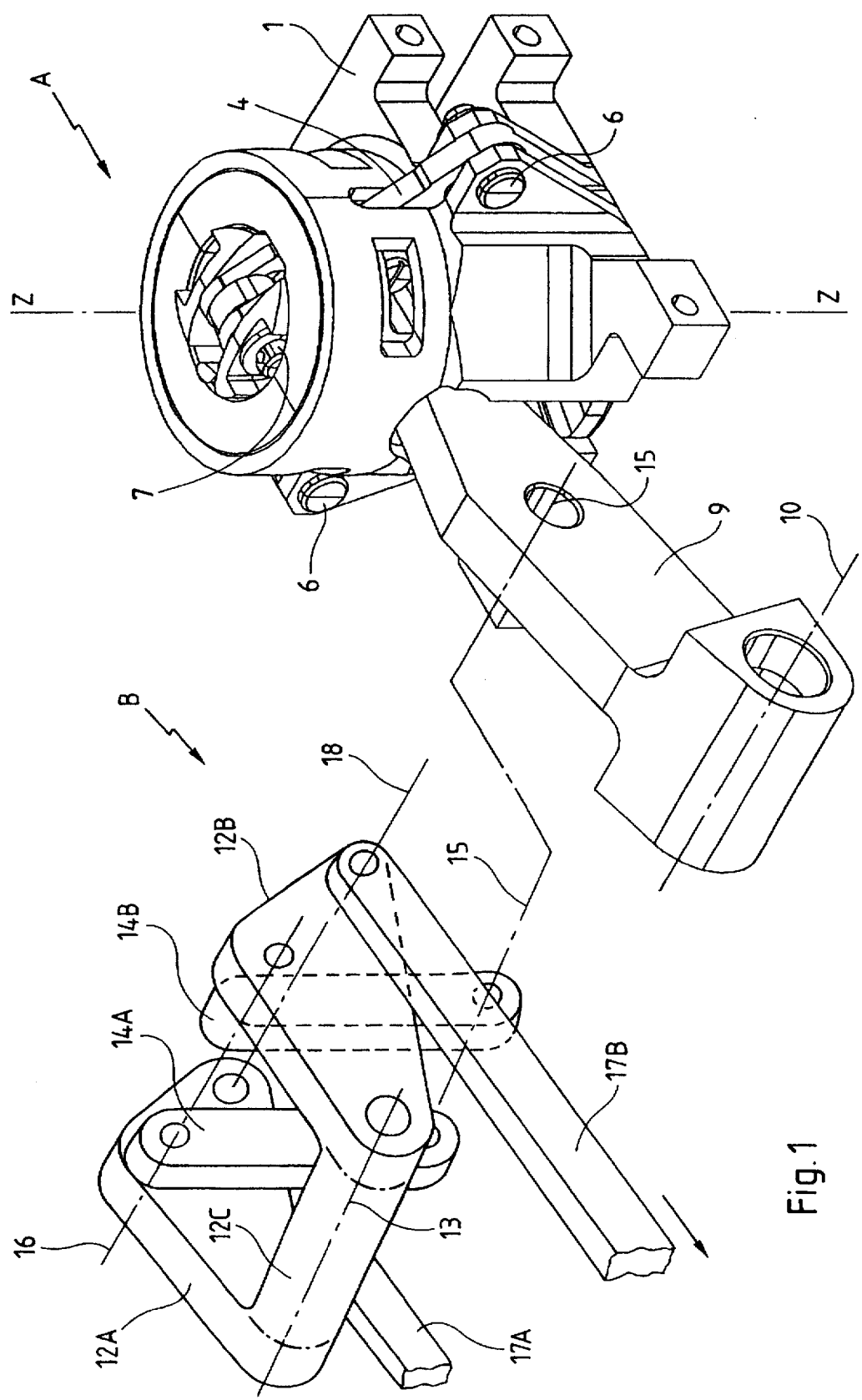

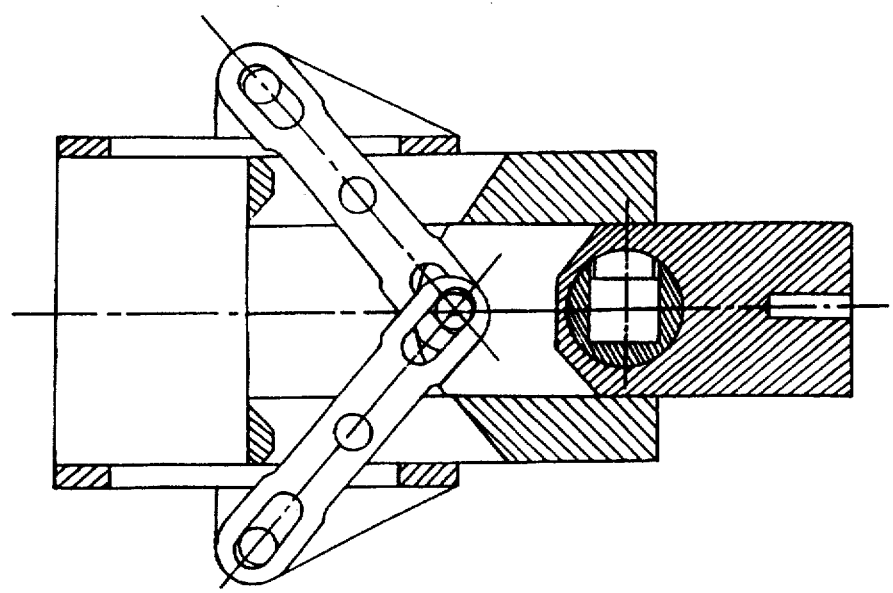
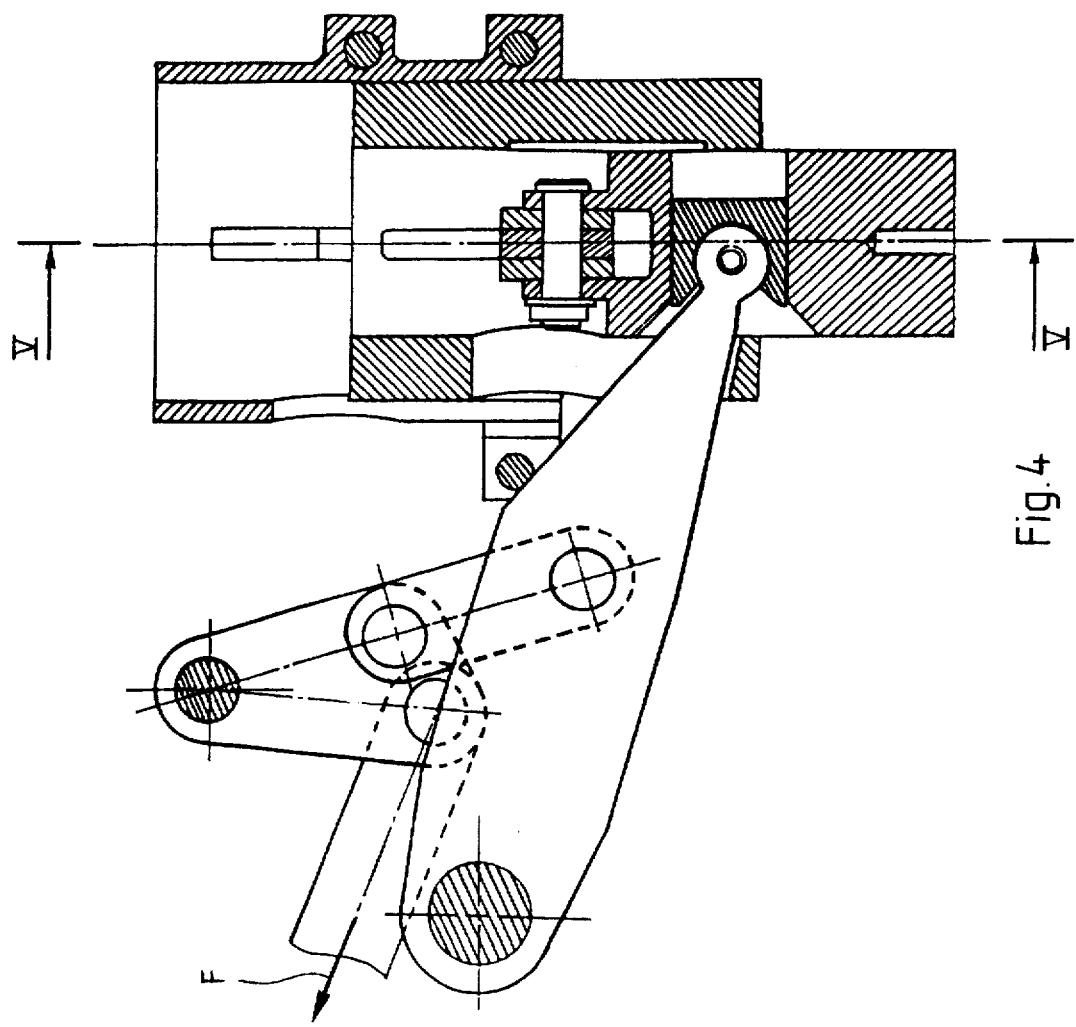
Fig. 5
Fig. 4

MECHANICAL EJECTOR DEVICE INCORPORATING A DOUBLE-ACTING PISTON

BACKGROUND OF THE INVENTION

1. Field of the Invention

The invention concerns an ejector device suitable for deploying payloads from aircraft or spacecraft and in which an ejector piston or plunger is mechanically actuated not only in the ejection or push direction but also in the opposite direction (in which connection the expression "swallowing" of the plunger is sometimes used).

2. Description of the Prior Art

Devices for ejecting loads (tanks or otherwise) from aircraft or spacecraft usually are pistons, possibly telescopic pistons, incorporated in a cylinder connected to a pyrotechnic or pneumatic supply. The piston acts directly or indirectly on the load to be ejected.

Examples of such ejector devices are described in French Patents 2,597,553; 2,671,175; 2,578,041; and 2,423,397.

Other ejector devices, although including only a piston-and-cylinder assembly, are of very similar designs, with airbag type fluid pressure means (see, for example, French Patent No. 2,664,373).

For effective performance these piston-and-cylinder assemblies (or the like) require a good seal. This requirement, when combined with constraints in respect of their ability to withstand high pressure and hot gas (in the case of pyrotechnic triggering), leads to the use of materials and component dimensions which are incompatible with the objective of saving weight.

With regard to overall dimensions, the height of current ejector devices, i.e. their dimension parallel to the ejection travel, is always greater than the latter travel, and this can cause problems with regard to their location.

Last, but by no means least, these ejector devices usually operate in an irreversible manner. When the pistons have ejected the load, they conventionally remain in a position in which they are deployed outside the ejector device, which causes unwanted drag and rapid wear of the pistons due to exposure to environmental attack.

The ejector devices have to be reset (re-armed) each time they operate.

There is generally no provision for returning the piston to its original position (in which case re-arming is independent of operation, and is carried out after the vehicle has landed, for example).

Various solutions have been put forward to the problem of "swallowing" the piston within the cylinder, for example in the previously mentioned French Patents 2,671,175 and 2,423,397. However, at present this swallowing requires dedicated auxiliary devices (degassing plus swallowing) which complicate the structure of the ejector device and increase its overall dimensions and weight.

An object of the invention is to alleviate the above drawbacks by means of an ejector device having a double-acting piston, which is small in size (in particular parallel to the ejection travel, to facilitate its installation at the maximum possible number of points on the vehicle concerned), low in weight (enabling the use of lightweight materials in components with small dimensions, a conventional constraint for aircraft and spacecraft equipment), quick in operation (re-arming is automatic and follows immediately after ejection), simple and easy to maintain (virtually no maintenance requirement, low operating cost), and does not penalize the performance of the ejector device itself (in particular, it does not compromise the possibility of controlling the attitude of the load during ejection, in the known manner).

SUMMARY OF THE INVENTION

To this end, the invention resides in a mechanical ejector device including an ejector piston movable along a sliding axis between a rest position and a service position, the device further including, for double-acting actuation of the piston:

- a lever substantially transverse to the sliding axis, articulated to a first fixed articulation axis disposed transversely to and at a distance from a sliding axis and to a first mobile articulation axis coupled axially to the piston and movable along the sliding axis between a rest position and a service position, the lever further including a second mobile articulation axis;
- a first link articulated to a second fixed articulation axis and including third and fourth mobile articulation axes;
- an actuator rod substantially transverse to the sliding axis, articulated to the third mobile articulation axis and adapted to displace the third mobile articulation axis longitudinally in a single displacement direction from a rest position to a final position; and
- a second link articulated to the second mobile articulation axis and to the fourth mobile articulation axis;
- the lever, the first link, the actuator rod and the second link being such that the fixed and mobile articulation axes are parallel to each other and perpendicular to the sliding axis and to the actuator rod, the fixed articulation axes being offset parallel to the sliding axis, and the first link and the second link forming a deformable assembly having a start configuration in which the first and third mobile articulation axes are in their respective rest positions and the fourth mobile articulation axis is behind a reference plane containing the second fixed and mobile articulation axes, where "behind" relates to the direction of displacement of the third mobile articulation axis, the deformable assembly having an intermediate configuration in which the first mobile articulation axis is in its service position and the fourth mobile articulation axis is in the reference plane, and a final configuration in which the first mobile articulation axis is at least approximately in its rest position and in which the fourth mobile articulation axis is in a position relative to the plane at least approximately symmetrical to the position of the fourth mobile articulation axis in the start configuration of the deformable assembly.

Note that the word "axis" as used herein denotes both a geometrical axis and the component(s) which define it; accordingly, as will emerge below, an axis can be made in two spaced and aligned parts.

The device of the invention solves the technical problem as stated above:

- the actuator system operating on the ejector piston is designed to return the piston to its original position after ejection using only the rectilinear movement of the load deployment actuator (i.e. the device synchronizing the launching and ejection operations, at all locations where this is necessary) and without requiring reverse movement of the latter;
- the device is a module which is simply mechanically linked (first link) to the transmission system actuated by a pyrotechnic or pneumatic supply; accordingly, the device does not require any hot gas seal or the use of high pressures; for these reasons the piston can be made from light materials, so that its mass is reduced, and does not require close tolerances in manufacture;

incorporation of the actuator mechanism transversely to the piston is also feasible in the direction of the height of the device, whereby its height is limited to the ejection travel and the load launcher is of minimal overall height;

the design ensures fast readying for use, restricted to re-arming of the load launcher mechanism;

the design and surface treatment of the materials enable dry operation of the various moving parts and minimum maintenance (no greasing or other lubrication); and mechanical actuation of the ejector device linked to the transmission system of the load launcher ensures synchronous displacement of two or more devices located at any relative distance.

In accordance with preferred features of the invention, some of which may be combinable with others:

the first mobile articulation axis constitutes a partially cylindrical end of the lever engaged in a transverse cylindrical housing in a nut adapted to slide perpendicularly to the sliding axis and to the fixed and mobile articulation axes;

the second mobile articulation axis is on the lever between the first fixed and mobile articulation axes; alternatively, the second mobile axis is on the opposite side of the first fixed axis to the first mobile articulation axis;

the second mobile articulation axis is substantially halfway between the first fixed and mobile articulation axes;

the single direction of displacement is away from the sliding axis; alternatively, it is towards this axis;

the actuator rod is between the first and second fixed articulation axes and between the second and fourth mobile articulation axes;

the fourth mobile articulation axis is at approximately equal distances from the second fixed articulation axis and the second mobile articulation axis;

the actuator rod is divided into two parts between which lies the first link which is divided into two branches, one on either side of the second link which is divided into two parts, one on either side of the lever;

the piston is telescopic; and the piston includes a central piston inserted in a tubular piston inserted in a fixed body, first links symmetrical about the sliding axis being pivotally mounted in a median portion to pivot about axes linked to the tubular piston and articulated at one end to articulation axes linked to the fixed body and at the other end to a common articulation axis linked to the central piston, the first links incorporating longitudinal openings cooperating with some of the axes.

Objects, features and advantages of the invention emerge from the following description given by way of nonlimiting example with reference to the appended drawings.

BRIEF DESCRIPTION OF THE DRAWINGS

FIG. 1 is an exploded perspective view of an ejector device of the invention in an initial configuration;

FIG. 4 is a view of the device in an intermediate configuration in axial section on the same section plane as in FIG. 2;

FIG. 5 is a view of the device in axial section taken along line V—V in FIG. 4;

DETAILED DESCRIPTION OF THE PREFERRED EMBODIMENT

Figure 3:
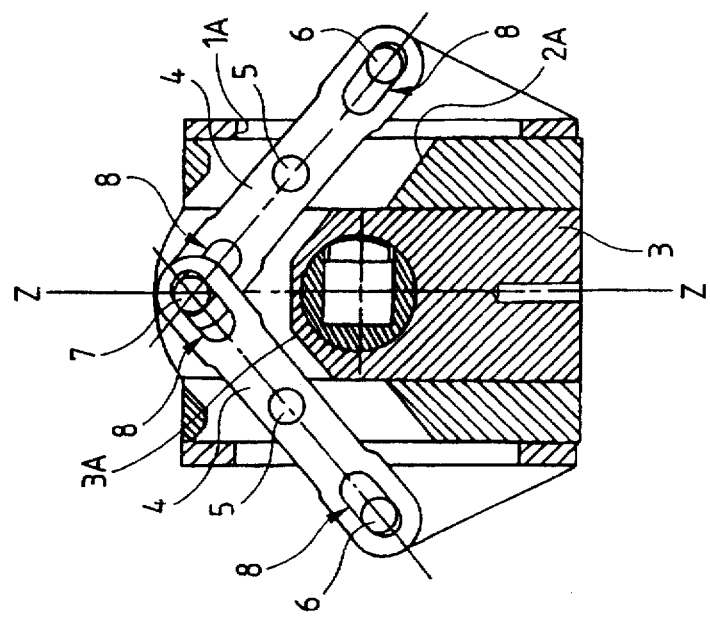
FIG. 3 is a view of the device in axial section taken along line III—III in FIG. 2.

The ejector device shown has two parts: a thrust assembly A which applies thrust to the load to be ejected (downwards in this example) and a mechanical actuator system B actuating to-and-fro movement of the moving parts of the thrust assembly A.

The thrust assembly A is advantageously of the telescopic piston type, which helps to minimize the overall size in the heightwise direction, i.e. parallel to a sliding axis Z—Z along which the thrust is applied.

The thrust assembly A comprises a main body 1 which guides sliding movement of a sleeve 2 forming an intermediate tubular piston and which in turn guides sliding movement of a central piston 3, and two first links 4 which are coplanar or in parallel planes and which pivot in a central region about pivot axes 5 linked axially to the intermediate piston 2 and which are articulated at a first end to the main body 1 by means of articulation axes 6 and at a second end to the central piston 3 by means of a common articulation axis 7.

In combination the intermediate and central pistons 2 and 3 form a telescopic piston. Because of the first links 4, the displacements of the intermediate and central pistons 2 and 3 relative to the main body 1 are geometrically similar.

Axial openings 1A, 2A and 3A are provided in the main body 1, in the intermediate piston 2, and in the central piston 3, respectively, for the first links to pass through. The pivot axes 5 are fixed to the intermediate piston through the axial opening 2A and the common axis 7 passes through the axial opening 3A.

To enable the first links 4 to pivot, they incorporate longitudinal openings 8 to cooperate with two of the three axes 5, 6 and 7. These longitudinal openings are preferably at the ends of the first links 4.

The first links are generally symmetrical about the sliding axis and the axes 5, 6 and 7 are parallel to each other and perpendicular to the sliding axis.

The central piston 3 has two extreme positions in which the inclination of the first links relative to the sliding axis is minimal (this angle is the angle between the maximal dimension of the first links and this axis). In these extreme positions the common axis 7 is in one or other of two positions symmetrical to the transverse plane of the articulation axes 6.

FIG. 3 shows a first of these extreme positions; this is a rest position. FIG. 5 shows the other of these extreme positions; this is a service position in which the piston is deployed to the maximum extent.

The mechanical actuator system B is adapted to displace the central piston 3 automatically from its rest position to its service position and then to return it at least approximately to its rest position.

Figure 2:
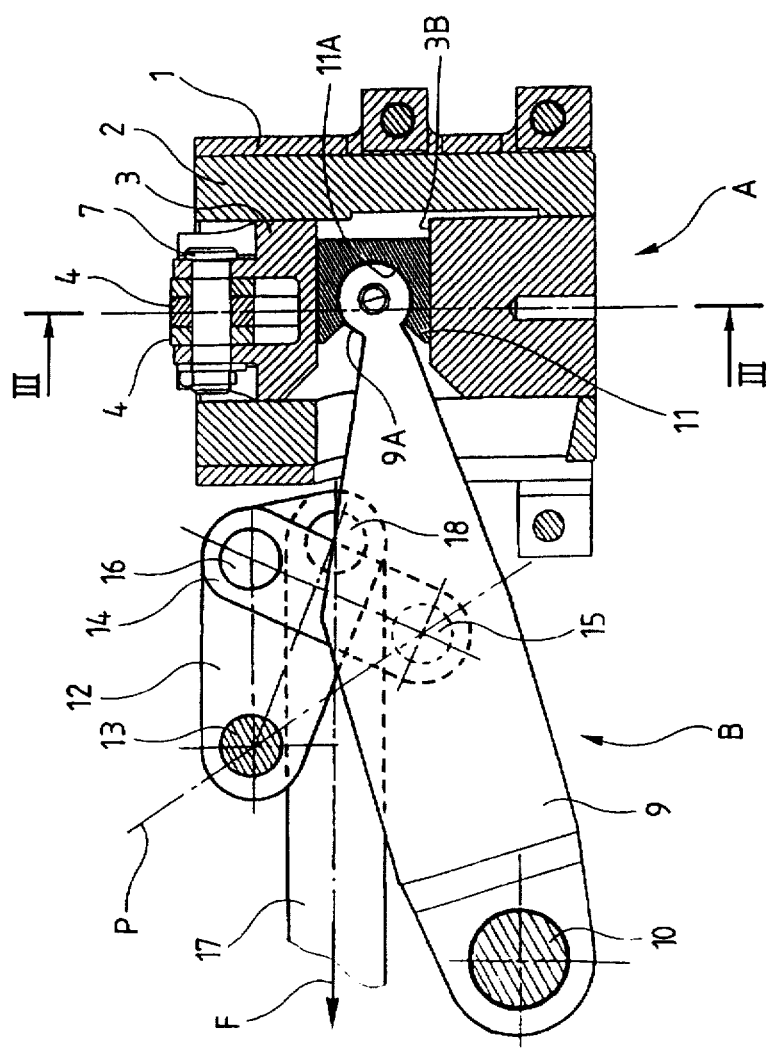
FIG. 2 is a view of the axial section of the device parallel to the operating rods of FIG. 1.
Figure 6:
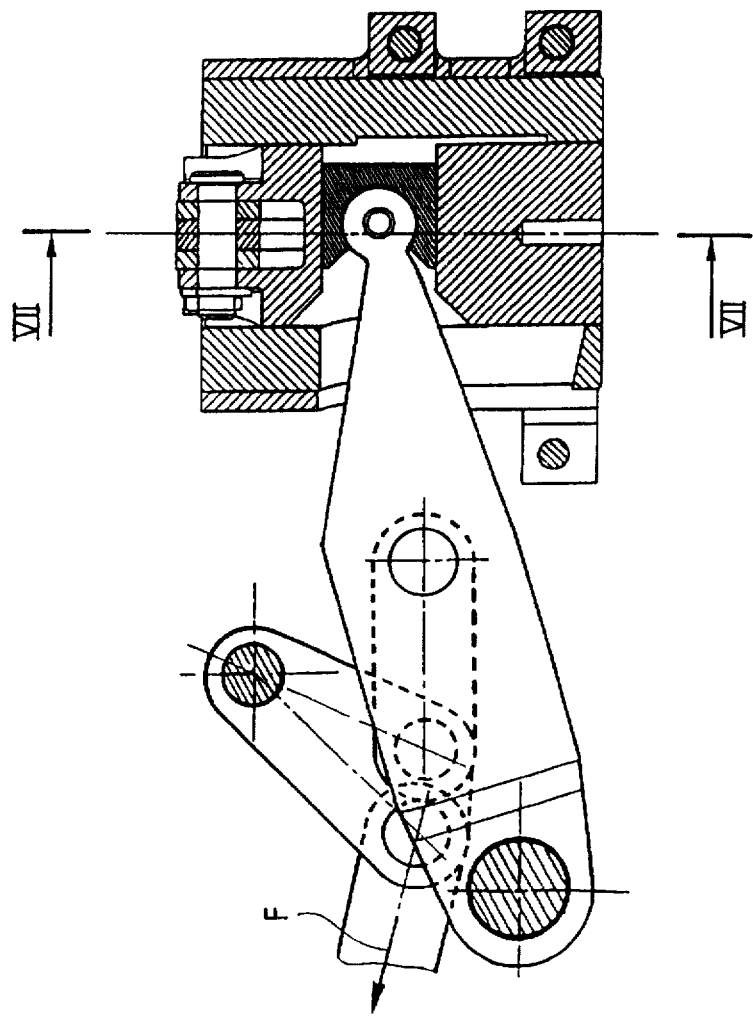
FIG. 6 is a view of the device in the final configuration in axial section on the same section plane as in FIGS. 2 and 4.

The mechanical actuator assembly B includes:

- a lever 9 transverse to the sliding axis, articulated to a first fixed articulation axis 10 transverse to and at a distance from the sliding axis and articulated to a first mobile articulation axis axially coupled to the central piston 3, in this example by a nut 11, this lever having a second mobile articulation axis 15;
- a first link or lever 12 articulated to a second fixed articulation axis 13 and having third and fourth mobile articulation axes 18 and 16;
- a second link 14 articulated to the lever 9 by means of the second mobile articulation axis 15 and to the first link 12 by means of the fourth mobile articulation axis 16; and
- an actuator rod 17 transverse to the sliding axis Z—Z, articulated to the first link 12 by means of the third mobile articulation axis 18 and adapted to apply to the latter a longitudinal force along the rod so as to displace it in a single displacement direction represented by the arrow F from a rest position (see FIG. 2) to a final position (see FIG. 6).

In this example the nut 11 couples the end of the lever 9 axially to the central piston 3, allowing relative pivoting between them. It is mounted in the piston so that it can slide transversely as the inclination of the lever 9 relative to the axis Z—Z varies, to allow for the fact that the lever 9 has a constant length. It is engaged in a housing 3B which in this example is circular and cylindrical and has an axis perpendicular to the axes 10 and Z—Z.

Figure 7:
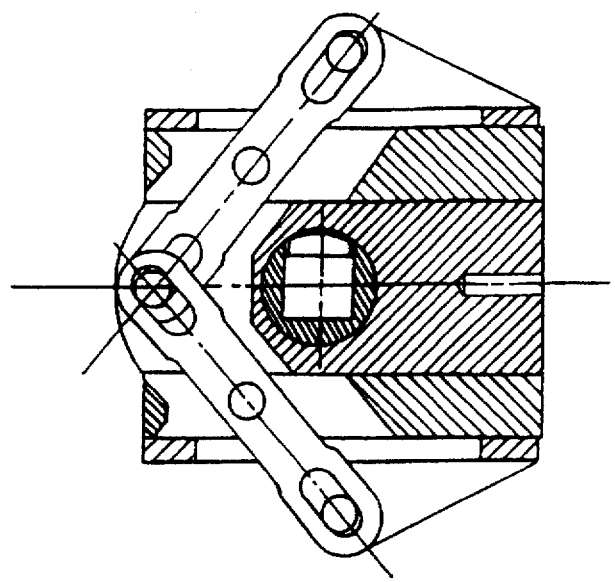
FIG. 7 is a view of the device in axial section taken along line VII—VII in FIG. 6.

The nut 11 includes a cylindrical housing 11a, the geometrical axis of which is parallel to the first fixed articulation axis 10 and opens laterally towards this axis through a slot subtending an angle less than 180°, as a consequence of which the surface of the cylindrical housing subtends an angle of more than 180°. An end 9A of the lever is shaped as a cylindrical head with its axis transverse to the lever and having a diameter substantially equal to that of the cylindrical housing 11A. It is easy to insert the head 9A in the housing 11A (from the right-hand side as seen in FIG. 3 or FIG. 5 or FIG. 7) provided that nut is outside the central piston 3. Inserting the nut into the central piston 3 locks the head 9A in the nut.

It will be realized that in this example the head 9A constitutes an articulation axis.

In an alternative embodiment, not shown, the cooperation between the lever 9 and the central piston 3 can be similar to that between the first links 4 and the central piston 3.

The fixed and mobile articulation axes are parallel to each other and perpendicular to the sliding axis Z—Z. They are preferably, but not necessarily, perpendicular to the axes 5, 6 and 7 to which the first links 4 are articulated, and vice versa.

The first and second fixed articulation axes 10 and 13 are offset in the "heightwise" direction, i.e. parallel to the sliding axis.

The first link or lever 12 and the second link 14 form a deformable assembly having:

- a start configuration (see FIG. 2) in which the first and third mobile articulation axes 9A and 18 are in initial rest positions and the fourth mobile articulation axis 16 is behind a reference plane P (FIG. 2) which contains the second fixed and mobile articulation axes 13 and 15, where "behind" relates to the direction F of displacement of the actuator rod 17;
- an intermediate configuration (see FIG. 4) in which the first mobile articulation axis 9A is in its service position (likewise the central piston 3) and the fourth mobile articulation axis is in the reference plane P; and
- a final configuration (see FIG. 6) in which the first mobile articulation axis 9A is at least approximately in its rest position and the fourth mobile articulation axis 16 is in a position at least approximately symmetrical to the position of the fourth mobile articulation axis 16 in the start configuration relative to the reference plane P.

There are many possible relative configurations of the fixed and mobile axes conforming to the above general remarks. Thus the configuration shown in the figures is merely one preferred example selected from many possibilities.

For compactness transverse to the ejection travel (movement of the end or head 9A), the second mobile articulation axis 15 is preferably between the first mobile and first fixed articulation axes 9A and 10, in this example substantially halfway between them.

For ease of installation, the actuator rod 17 preferably operates in traction, moving away from the sliding axis.

For compact height and high mechanical stiffness, the actuator rod 17 advantageously passes between the fixed articulation axes and between the second and fourth mobile articulation axes 15 and 16.

For compact height and width and for reliability, the axes 13, 16 and 15 form a triangular prism with non-null angles.

For compactness in service, the fourth mobile articulation axis 16 is advantageously at at least approximately equal distances from the second mobile articulation axis 15 and the second fixed articulation axis 13.

In this example the first link or lever 12 is in one piece with two parallel branches 12A and 12B attached to a sleeve 12C pivoting about the second fixed articulation axis 13, the second link 14 being divided into two parts 14A and 14B, one on either side of the lever 9, between the parallel branches 12A and 12B, the actuator rod 17 being divided into two parts 17A and 17B, one on either side of the first link 12.

As shown in FIG. 1, for rigidity the lever 9 has a transverse sleeve fitted around the first fixed articulation axis 10.

It goes without saying that the above description has been given by way of nonlimiting example only and that the person skilled in the art can devise numerous variations thereon without departing from the scope of the invention.

For example:

- the rod can operate in thrust rather than traction;
- the rod can be on the same side of the fixed axes (either above or below), the fourth mobile articulation axis 16 being opposite the second mobile axis relative to the second fixed axis in the intermediate configuration;
- the second mobile articulation axis 15 can be opposite the first mobile articulation axis 9A relative to the first fixed articulation axis 10.

As a precautionary measure, a pin can be used to fasten the end 9A into the nut 11.

What is claimed is:

1. A mechanical ejector device for double acting actuation of a piston, said mechanical ejector device comprising:

a lever;

a first fixed articulation axis about which said lever pivots;

a first mobile articulation axis associated with said lever and spaced from said first fixed articulation axis, said first mobile articulation axis coupled to said piston;

a second mobile articulation axis associated with said lever and parallel to said first mobile articulation axis;

a sliding axis associated with said piston along which said first mobile articulation axis is movable, said sliding axis located a distance from said first fixed articulation axis; and means for mechanically articulating said lever to actuate said piston between a rest position and a service position, said mechanical articulating means connected to said lever on said second mobile articulation axis, said mechanical articulating means comprising:

a first link having a third mobile articulation axis;

a second fixed articulation axis about which said first link pivots;

a second link articulated to said second mobile articulation axis, said second link having a fourth mobile articulation axis, said first link articulated to said fourth mobile articulation axis; and an actuator rod articulated to said third mobile articulation axis for displacing said third mobile articulation axis longitudinally in a single displacement direction from a first predetermined rest position to a final position, said actuator rod positioned transverse to said sliding axis.

2. The mechanical ejector device of claim 1 further comprising:

a transverse cylindrical housing;

a nut slidably engaged in said transverse cylindrical housing, said nut being adapted to slide perpendicularly to said sliding axis and to said first and second fixed and said second and fourth mobile articulation axes; and said lever further comprising an end coupled to said nut.

3. The mechanical ejector device of claim 1 wherein said second mobile articulation axis is on said lever between said first fixed articulation axis and said first mobile articulation axis.

4. The mechanical ejector device of claim 3 wherein said second mobile articulation axis is substantially halfway between said first fixed articulation axis and said first mobile articulation axis.

5. The mechanical ejector device of claim 1 wherein said single displacement direction is away from said sliding axis.

6. The mechanical ejector device of claim 1 wherein said actuator rod is between said first and second fixed articulation axes and between said second and fourth mobile articulation axes at least during said service position.

7. The mechanical ejector device of claim 1 wherein said fourth mobile articulation axis is at a first distance from said second fixed articulation axis and said fourth mobile articulation axis is at a second distance from said second mobile articulation axis, said first and second distances being approximately equal.

8. The mechanical ejector device of claim 1 wherein said piston is telescopic.

9. The mechanical ejector device of claim 8 wherein said piston further comprises:

a main body;

an intermediate body inside said main body;

a central body inside said intermediate body;

a first piston link pivotally mounted to said intermediate body, said first piston link having a first end, said first piston link having a second end;

a second piston link pivotally mounted to said intermediate body, said second piston link having a first end, said second piston link having a second end;

wherein said first piston link has a first articulation axis about which said first end of said first piston link articulates;

said second piston link has a second articulation axis about which said first end of said second piston link articulates, said first and second piston links each having a common articulation axis about which said second ends of said first piston link and said second piston link articulate; and said first piston link and said second piston link each having a longitudinal opening for cooperating with a plurality of said first articulation axis, said second articulation axis, and said common articulation axis.

10. The mechanical ejector device of claim 1 wherein said actuator rod further comprises:

a first part located on a side of said first link;

a second part located on another side of said first link;

said first link having a first branch located on one side of said second link;

said first link having a second branch located on another side of said second link;

said second link having a first part located on one side of said lever; and said second link having a second part located on another side of said lever, whereby said actuator rod straddles said lever for a compact height dimension.

* * * * *